(12) United States Patent
Sen et al.

(10) Patent No.: US 8,059,571 B2
(45) Date of Patent: Nov. 15, 2011

(54) METHODOLOGY FOR DESIGNING ENVIRONMENT ADAPTIVE ULTRA LOW POWER WIRELESS COMMUNICATION SYSTEMS AND METHODS

(75) Inventors: Shreyas Sen, Atlanta, GA (US); Abhijit Chaterjee, Marietta, GA (US); Rajarajan Senguttuvan, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 815 days.

(21) Appl. No.: 12/040,884

(22) Filed: Mar. 1, 2008

(65) Prior Publication Data

US 2009/0219863 A1    Sep. 3, 2009

(51) Int. Cl.
*G08C 17/00* (2006.01)
*H04J 3/16* (2006.01)
*H04J 3/22* (2006.01)
*H04B 1/00* (2006.01)
*H04B 1/16* (2006.01)

(52) U.S. Cl. ........ 370/311; 370/465; 455/311; 455/312; 455/343.1; 455/343.2

(58) Field of Classification Search .................. 455/296, 455/311, 312, 343.1, 343.2; 370/310, 311, 370/465
See application file for complete search history.

(56) References Cited

U.S. PATENT DOCUMENTS

| | | | |
|---|---|---|---|
| 5,193,210 A | 3/1993 | Nicholas et al. | |
| 5,568,094 A | 10/1996 | Bowen et al. | |
| 6,157,822 A | 12/2000 | Bastani et al. | |
| 6,850,753 B2 | 2/2005 | Zhang et al. | |
| 6,912,242 B2 | 6/2005 | Farine et al. | |
| 2007/0021087 A1* | 1/2007 | Turner | 455/298 |

* cited by examiner

*Primary Examiner* — Ronald Abelson
(74) *Attorney, Agent, or Firm* — Ryan A. Schneider, Esq.; Trenton A. Ward, Esq.; Troutman Sanders LLP

(57) ABSTRACT

Low-power wireless receivers and low-power communication methods and systems are provided. According to some embodiments, a low-power wireless receiver can comprise an input module, a controller, and a feedback loop. The input module can receive a wireless signal from a wireless communication channel. The controller can receive the wireless signal and provide a control signal corresponding to the wireless communication channel. The controller can be operatively configured to dynamically modify the control signal responsive to conditions of the wireless signal and/or the communication channel. The feedback loop can be disposed between the controller and the input module and can dynamically provide the control signal to the input module such that the input module can modify quality conditions of the wireless signal. Dynamic adaptations can occur in real-time so that a low-power wireless device can manage power consumption in response to a quality of signal metric that reflects conditions of a wireless communication channel. Other embodiments are also claimed and described.

9 Claims, 7 Drawing Sheets

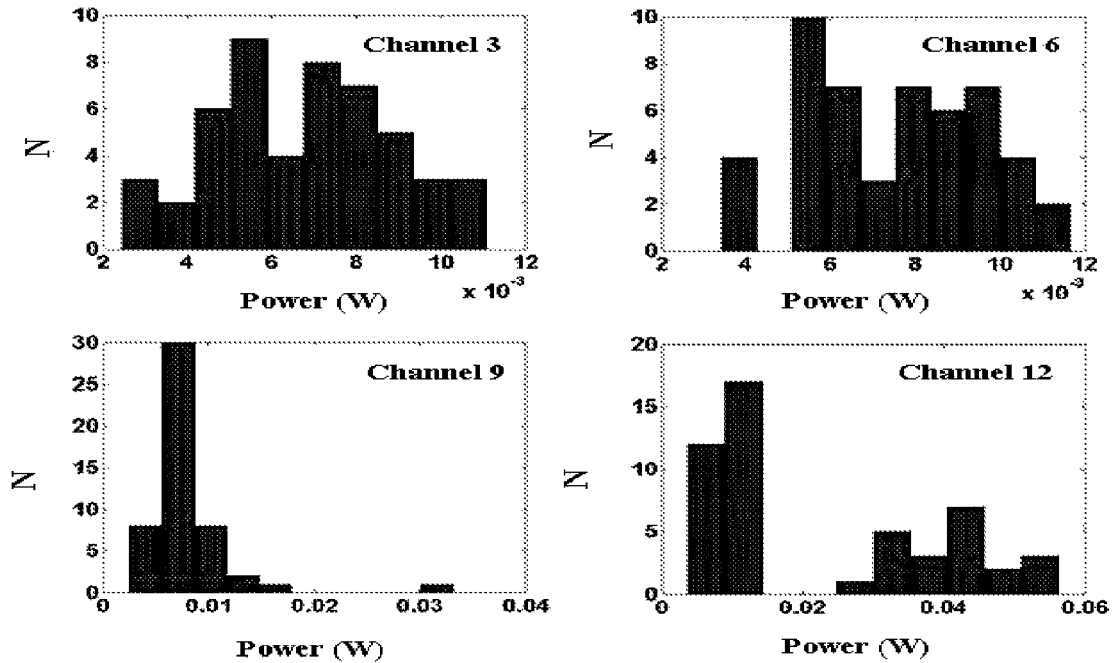
FIG. 11
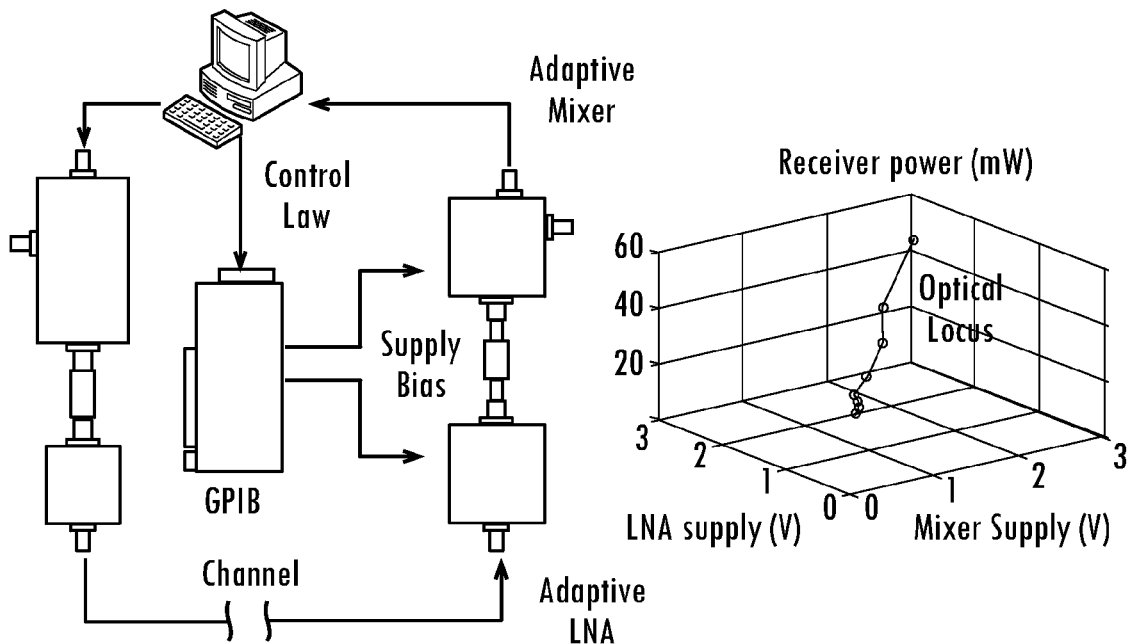
FIG. 12A
FIG. 12B
FIG. 12

METHODOLOGY FOR DESIGNING ENVIRONMENT ADAPTIVE ULTRA LOW POWER WIRELESS COMMUNICATION SYSTEMS AND METHODS

FEDERALLY SPONSORED RESEARCH STATEMENT

The embodiments of the invention described herein were made with partial Government support under Grant Nos. CCR-032555 and GSRC/FCRP 2003-DT-660, awarded by the National Science Foundation. The Government may have certain rights to inventions claimed and described in this patent application.

TECHNICAL FIELD

The various embodiments of the present invention relate generally to wireless communication devices and techniques, and more particularly, to low-power wireless devices and low-power communication methods and systems employing power management features.

BACKGROUND

Usage of wireless communication devices in today's society is increasing daily. The increase is due in large part to the increased functionality of wireless communication devices, wireless device size reduction, and also society's ever increasing desire to stay connected. Wireless devices and networks also continue to utilize improved bandwidth technologies which both provide increased wireless communication abilities further leading to increased acceptance by society. While wireless devices will no doubt continue to be increasingly adopted by society, users will likely continue to encounter power source challenges with wireless devices since wireless devices must necessarily use a mobility enabled power source, such as a battery pack or rechargeable battery pack, for wireless operation.

Current wireless devices, including radio frequency (RF) wireless devices, address power supply issues in various manners. For example, current design techniques for power minimization in RF circuits include bias current reuse, controlled positive feedback, high impedance interfaces, and sub-threshold biasing. Another technique is to modulate data rate based on changing communication environments. All of these techniques, however, are designed to operate at all times under pre-set worst-case wireless channel operating conditions. Usually, operating in a worst-case design assumption ensures that wireless devices enable adequate wireless communication no matter what conditions of wireless channels may be present. But such operation, at times, consumes power resources in an inefficient manner.

Accordingly, there exists a need for wireless devices, methods, and systems with improved power conservation features. Indeed, there is a need for transmitters, receivers, and transceivers with improved signal processing components that utilize power conservation techniques. It is to the provision of such low-power wireless communication devices, methods, and systems that the various embodiments of the present invention are directed.

BRIEF SUMMARY

Various embodiments of the present invention are directed to wireless devices, methods, and systems having improved power conservation characteristics. According to some embodiments, wireless communication devices are configured to operate in a manner such that power is conserved when communication channels conditions have low interference. For example, embodiments of the present invention dynamically adapt to surrounding environments by adjusting power characteristics rather than always assume that surrounding environments present worst-case communication channels.

Dynamic adaptation advantageously enables power conservation by minimizing power usage when low interference communication channels are present. Indeed by utilizing built-in design margins in wireless systems and dynamically adjusting wireless systems across ever changing channel conditions, power can be conserved and saved. A feature of embodiments of the present invention includes use of an adaptation metric to quantify status of a wireless communication channel (including wireless portion and device portion) to enable power usage management. When an adaptation metric has a high value (e.g., high fidelity of a received signal) signal processing quality can be modified intentionally by reducing component power sourcing to save power. Another feature includes performing dynamic modifications such that power consumption can be reduced, or increased, to ensure that a specified maximum bit-error-rate (BER) is maintained. By doing this, a wireless device can operate at low power consumption levels. Yet another feature includes a feedback control technique to enable adaptation to dynamically changing wireless channel conditions to save power when channel quality is not a worst-case scenario while also satisfying one or more desired BER conditions.

Generally described, some embodiments of the present invention are low-power wireless communication receivers capable of adapting to dynamically changing communication channel conditions. The receiver can generally comprise an input module, a controller, and a feedback loop. The input module can receive a wireless signal from a communication channel. The controller can be coupled to the input module, receive the wireless signal, and provide a control signal corresponding to conditions of the communication channel. The controller can also be operatively configured to dynamically modify the control signal responsive to at least one of conditions of the wireless signal and the communication channel. The feedback loop can be disposed between the controller and the input module. The feedback loop can be adapted to dynamically provide the control signal to the input module such that the input module can modify quality conditions of the wireless signal. In some embodiments, a wireless receiver can comprise an analog-to-digital converter disposed between the input module and the controller. The analog-to-digital controller can receive a control signal from the controller and in response modify a resolution characteristic of an output of the analog-to-digital converter.

Wireless receivers according to embodiments of the present invention can also have additional features. For example, the controller can be configured to provide a guard band setting responsive to conditions of the wireless signal. As another example, the controller can be further configured to modify the control signal based on the guard band setting such that the wireless signal maintains a quality characteristic above an error rate associated with the communication channel. As another example, the controller can be configured to modify the control signal such that the input module can receive the wireless signal at varying data rates. As yet another example, the controller can be configured to modify the control signal such that varying supply or bias voltages are provided to the input module from a power source coupled to the input module.

The controller can be further configured to generate an adaption metric in some embodiments. The adaptation metric can be based in part on conditions of the wireless control signal and/or the communication channel. The adaption metric can be used at least partially for generation of the control signal for modifying the wireless signal. Also, the adaptation metric generated by the controller is an error vector magnitude characteristic of the wireless signal.

According to still yet additional embodiments, wireless receiver embodiments can have a controller can comprising a memory. The memory can be used to store a table for storing a control law. The control law can comprise various predetermined settings for providing the control signal. Indeed, upon receiving conditions corresponding to the wireless signal and/or the communication channel, the controller provides the control signal based at least in part on the control law stored in the table. In some embodiments, the control law can comprise predetermined variable settings for at least one of a low noise amplifier, a mixer, and an analog-to-digital converter.

Some embodiments of the present invention can be low-power wireless transceivers for use in wireless communication devices. A transceiver can generally comprise a receiver module, a transmitter module, a signal processor module (e.g., a digital signal processor), and a controller. The receiver module and the transmitter module can be both coupled to the signal processor module. The signal processor adapted to process received wireless signals and process signals for transmission. The controller can be operatively configured to dynamically control at least one of the receiver module and the signal processor module in response to quality conditions of received wireless communication signals by providing a control signal to the at least one of the receiver module and signal processor module. In some embodiments, the controller and the signal processor can be the same component and in others, separate components.

Transceiver embodiments of the present invention can also include other features. For example, the controller can comprise a memory for storing a control law. The control law can comprise a plurality of predetermined values used to provide the control signal for dynamically altering operational characteristics of the receiver module or the signal processor module. The control law can be a function of a minimum power locus and a quality of signal metric. Also, the receiver module and/or transmitter module can comprise an amplifier, a mixer, and a converter. Such components enable reception and transmission of wireless communication signals. The amplifier, the mixer, and the converter are configured to receive the control signal from the controller such that operational characteristics of the amplifier, the mixer, and the converter are dynamically modified.

For example, in some embodiments components can comprise tuning knobs for controlling sourced voltages. The tuning knobs can be modified (or tuned) with a control signal. The control signal can comprises a voltage control portion to dynamically modify at least one of a supply voltage and bias voltage provided to the receiver module and its components. Also, the control signal can comprise a converter portion to dynamically modify resolution characteristics of at least one of an analog-to-digital converter and a digital-to-analog converter. Still yet, the control signal can comprises a processor portion to dynamically modify distortion characteristics of the signal processor module. Also, the controller can be further operatively configured to calculate an adaptation metric. The adaptation metric can be based at least in part on conditions of received wireless communication signals to provide the control signal for dynamically controlling to the receiver module or the signal processor module.

Some embodiments of the present invention can be methods to configure a wireless device for power consumption management. Configuration can occur during manufacturing or in configuring a device. According to some embodiments, a method for configuring a wireless device to operate having improved power management operations can generally comprise configuring a device to receive a wireless communication signal and configuring the device to dynamically analyze the received wireless communication signal. The analysis can occur in real-time to determine characteristics about a wireless communication channel in which the wireless communication signal travels. Method embodiments can also include configuring the device to dynamically modify reception operations in response to the determined characteristics about the wireless communication channel.

Method embodiments of the present invention can also include additional features. For example, a method can include configuring a device to dynamically alter at least one of voltage, resolution, and distortion values provided to one or more components in the device in response to the determined characteristics about the wireless communication channel. Also, a method can include providing a device with a memory to store a control law used to dynamically modify reception operations of the device in response to the determined characteristics about the wireless communication channel. Still yet, a method can include providing a device with a controller configured to determine an adaptation metric based at least in part on an error vector magnitude of the received wireless communication signal. Method embodiments can also include determining an optimized set of settings for a device and storing the optimized settings in the device for use as a control law for use in dynamically controlling the device. Some methods can also include providing a device with a controller configured to establish a dynamic guard band setting such that device operates marginally above a predetermined bit error rate. And still yet, some method embodiments can include determining a control law as a function of minimum power locus for a maximum allowable wireless signal quality of signal metric and storing said control in the device for analyzing the received wireless communication signal in real-time.

Other aspects and features of embodiments of the present invention will become apparent to those of ordinary skill in the art, upon reviewing the following description of specific, exemplary embodiments of the present invention in conjunction with the accompanying figures.

BRIEF DESCRIPTION OF DRAWINGS

FIG. 11 illustrates several charts depicting data showing the effect of manufacturing process variations obtained during simulation of embodiments of the present invention.

FIG. 12 illustrates a schematic diagram of a wireless receiver embodiment (FIG. 12A) of the present invention used for simulation along with a graphical depiction of a control law locus curve (FIG. 12B) used for controlling the illustrated wireless receiver embodiment (FIG. 12A).

DETAILED DESCRIPTION OF PREFERRED & ALTERNATIVE EMBODIMENTS

Figure 1:
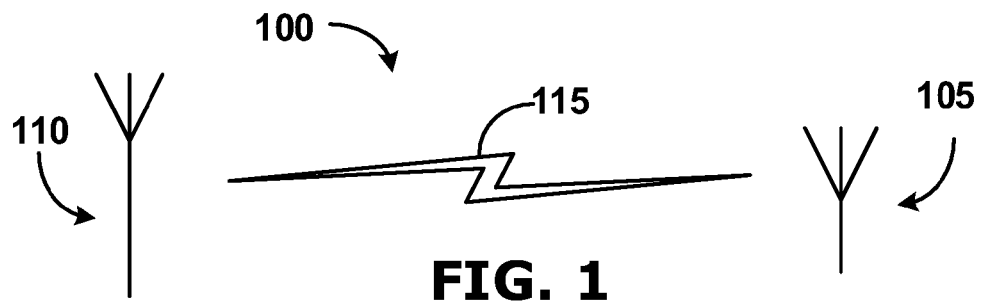
FIG. 1 illustrates a schematic example of a conventional wireless communication system that utilizes conventional signal processing technologies.

Referring now to the figures, wherein like reference numerals represent like parts throughout the several views, exemplary embodiments of the present invention will be described in detail. Throughout this description, various components may be identified as having specific values or parameters, however, these items are provided as exemplary embodiments. Indeed, the exemplary embodiments do not limit the various aspects and concepts of the present invention as many comparable parameters, sizes, ranges, and/or values may be implemented.

Embodiments of the present invention can be deployed in many applications. Indeed, while certain embodiments of the present invention discussed herein are discussed as being used in handheld, portable wireless devices, the scope of the invention is not so limited. Rather, the concepts and principles of the present invention can be used for many wireless communication devices whether or not they are mobile or portable. Such devices may include wireless routers, repeaters, cell phone towers, cell phone transponders, wireless node transmission points in a wireless network, handheld telephones, wireless computers, handheld computers, PDAs, and many others. Still yet, embodiments of the present invention can be employed in any receivers, transmitters, or transceivers to manage power consumption.

Figure 2:
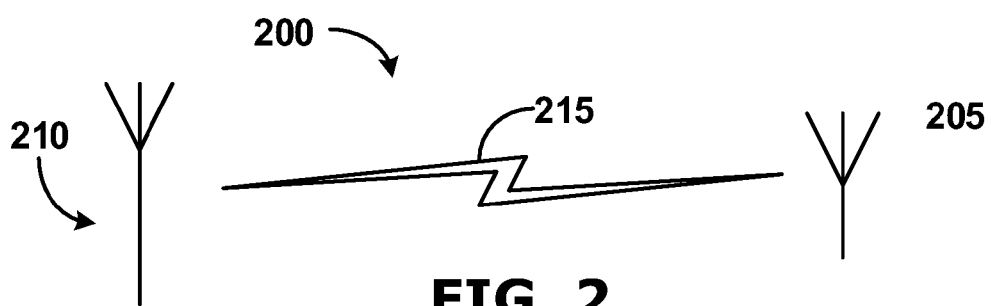
FIG. 2 illustrates a wireless communication system employing power conservation techniques according to some embodiments of the present invention.

Turning now to FIGS. 1-2, a general discussion of concepts utilized in accordance with embodiments of the present invention is provided. FIG. 1 illustrates an example of a conventional wireless communication system 100. The system 100 generally includes a wireless device 105 (e.g., a cell phone, PDA, wireless Ethernet card, wireless broadband card, etc.), a communication tower 110, and a wireless communication channel 115. The conventional wireless system 100 can employ a conventional wireless device 105. The conventional wireless device 105 is designed to always transmit and receive wireless signals based on worst-case conditions of communication channel 115 (as discussed above). By always operating under such worst-case conditions, the conventional wireless device 105 assumes that it is operating under worst-case conditions so it uses it power resources to ensure adequate reception and transmission of wireless communication signals in a worst-case environment.

Given the worst-case design of the conventional wireless device 105, it never alters its power usage associated with wireless transmission and reception. Indeed, the device 105 ignores conditions of the communication channel 115 because it assumes it is always worst case. Embodiments of the present invention, however, advantageously adapt power usage characteristics based on conditions of a communication channel and/or received wireless signals. For example, FIG. 2 illustrates a wireless communication system 200 employing power conservation techniques according to some embodiments of the present invention. Such techniques can include dynamic adaption of power usage in response to communication channel conditions, conditions of receive wireless signals, wireless device manufacturing variations, and wireless device performance over time (i.e., device wear out).

Generally, FIG. 2 includes an improved wireless device 205, an improved wireless communication tower 210 (which can include, e.g., a transmitter, a transponder, or a transceiver), and a wireless communication channel 215. As will be discussed below in more detail, the wireless device 205 and/or the wireless communication tower 210 can analyze or monitor conditions of the communication channel 215 and in response dynamically adjust power usage. The wireless device 205 and/or the wireless communication tower 210 can also be configured to adapt power usage based on conditions of received signals or based on device performance characteristics such as those stemming from manufacturing variations or device use over time. By utilizing power conservation techniques, the wireless communication system 200 (or components thereof) can be configured to use limited power to ensure adequate wireless communication based on wireless communication channel 215 conditions rather than assuming wireless communication channel 215 conditions are some predetermined worst case condition.

A contemplated example of an embodiment of the present invention is if the improved wireless device 205 is a cell phone or PDA. To enable wireless communication, the wireless device can include a receiver, transmitter, or a combination thereof (as discussed herein). The improved wireless device 205 can dynamically alter its power consumption based on environmental characteristics and manufacturing characteristics to enable efficient power consumption while ensuring adequate wireless communication. Such dynamic adaptation can occur if the wireless device 205 (as a cell phone or PDA) is close to a wireless transponder (e.g., a cell tower or other wireless hotspot) by having the improved wireless device 205 consumer lower power relative to a scenario when the wireless device 205 is further away from a wireless transponder. Embodiments of the present invention can also be employed to conserve power consumption taking into account device manufacturing variances and device usage characteristics.

Figure 3:
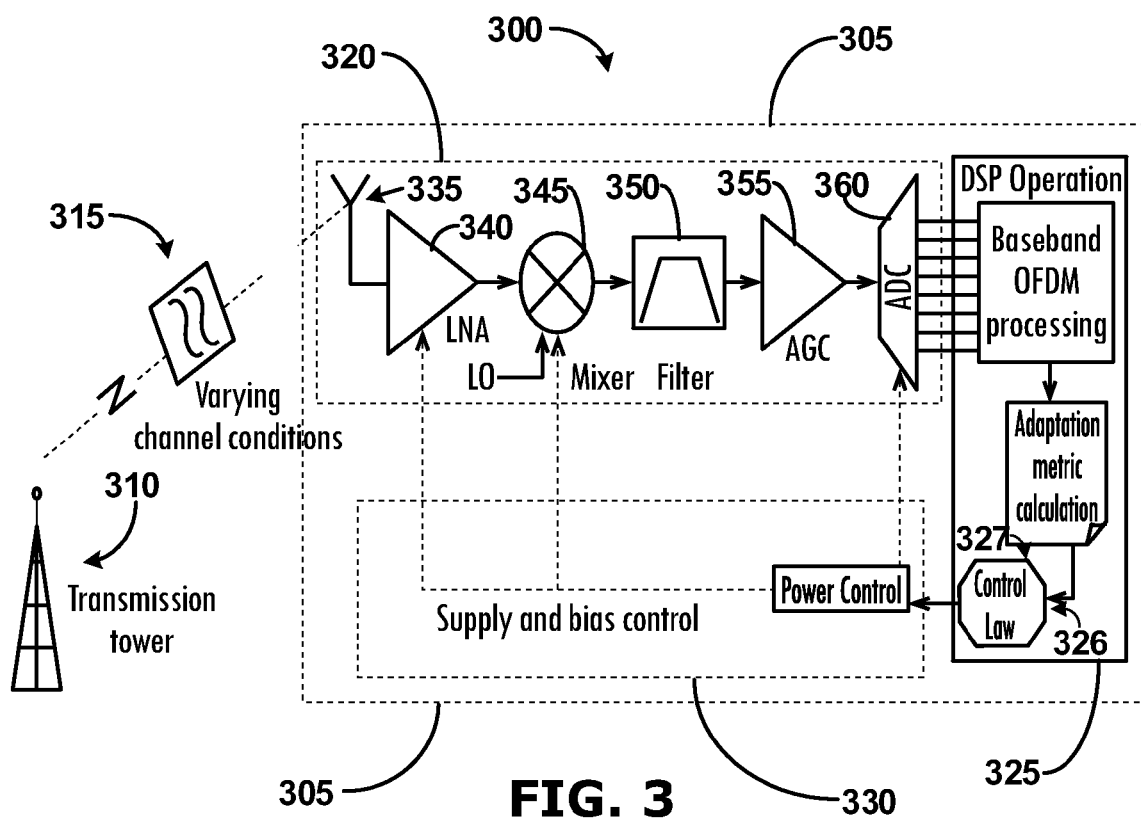
FIG. 3 illustrates a functional block diagram of a low-power wireless communication system that incorporates a wireless low-power receiver according to some embodiments of the present invention.

FIG. 3 illustrates a functional block diagram of a wireless communication system 300 in use according to some embodiments of the present invention. Generally, the wireless communication system 300 includes a wireless receiver 305, a transmission tower 310, and a wireless communication channel 315. As shown, the wireless receiver 305 and the transmission tower 310 communicate through the wireless communication channel 315 that is subject to varying channel conditions due to ever-changing environmental conditions.

Such channel conditions can include one or more of multipath, interference (e.g., microwave and adjacent channel), path loss, and noise. To communicate with each other, the wireless receiver 305, the transmission tower 315 transmits one or more wireless signals for reception by the wireless receiver 305 and vice versa. Wireless communication protocols are well known to those of ordinary skill, and thus for brevity, are not discussed herein.

To receive wireless transmissions from the transmission tower 310, the wireless receiver 305 can employ multiple components. For example, the wireless receiver 305 can generally include an input module 320, a signal processor 325, and a controller 330. Some of ordinary skill in the art may denote the input module 320 (with fewer or less components as shown) as an RF front end of a receiver. The signal processor 325 can be a digital signal processor (DSP) and the controller 330 can be many types of processor or controller capable of controlling one or more other devices. In some embodiments, the signal processor 325 and the controller 330 may reside on the same chip, on the same board, or may be separate physical components in close proximity. Thus it should be understood that the signal processor 325 and the controller 330, although at times discussed herein as separate components with differing functions, can be a single component configured to function as both the signal processor 325 and the controller 330 as discussed herein. As illustrated, the input module 320 can be coupled to the signal processor 325, the signal processor 325 can be coupled to the controller 330, and the controller 330 can be coupled to various components of the input module 320 and also, optionally, to the signal processor 325.

Generally, in operation, the input module 320 can receive a wireless signal transmission from the wireless communication channel 315. The input module 320 can be used to amplify, filter, and convert the wireless signal transmission. Also, the input module 320 can provides the wireless signal transmission to the signal processor 325 for processing and so that the signal processor 325 can convey information contained in the wireless signal transmission to a user. For example, if the wireless receiver 305 resides in a cell phone, the signal processor 325 may provide voice data contained in a wireless signal transmission to an audio device capable of providing the voice data to a user. Similarly, if the wireless receiver 305 is employed in a wireless computing device, the signal processor 325 may provide digital data contained in a wireless signal transmission so that a user can receive the digital data as an email transmission, voicemail transmission, or wireless internet connection data.

As illustrated, the input module 320 of the wireless receiver 305 may include various components. For example, the input module 320 may include an antenna 335, an amplifier 340, a mixer 345, a filter 350, an auto gain control 355, and analog-to-digital converter 360. Theses components may be coupled together as shown in FIG. 3 and in other embodiments may be coupled in different arrangements. In some embodiments, the input module 320 may only include the amplifier 340 and the mixer 345. Also, an input module 320 according to embodiments of the present invention may include additional components or less than those shown in FIG. 3. For example, filter 350, the auto gain control 355, and the analog-to-digital converter 360 may be separate components from the input module in some embodiments and in others, an input module 320 may include an oscillator (as denoted by "LO" in FIG. 3) coupled to the mixer 345. According to still yet other embodiments, various components of the input module 320 may be coupled to the controller 330. For example, the amplifier 340, the mixer 345, and the analog-to-digital converter 360 may be coupled to the controller 330, as shown in FIG. 3, thereby enabling the controller 330 to control operating characteristics of these components. Such operating characteristics can include bias and supply voltage sourcing and resolution settings.

Figure 4:
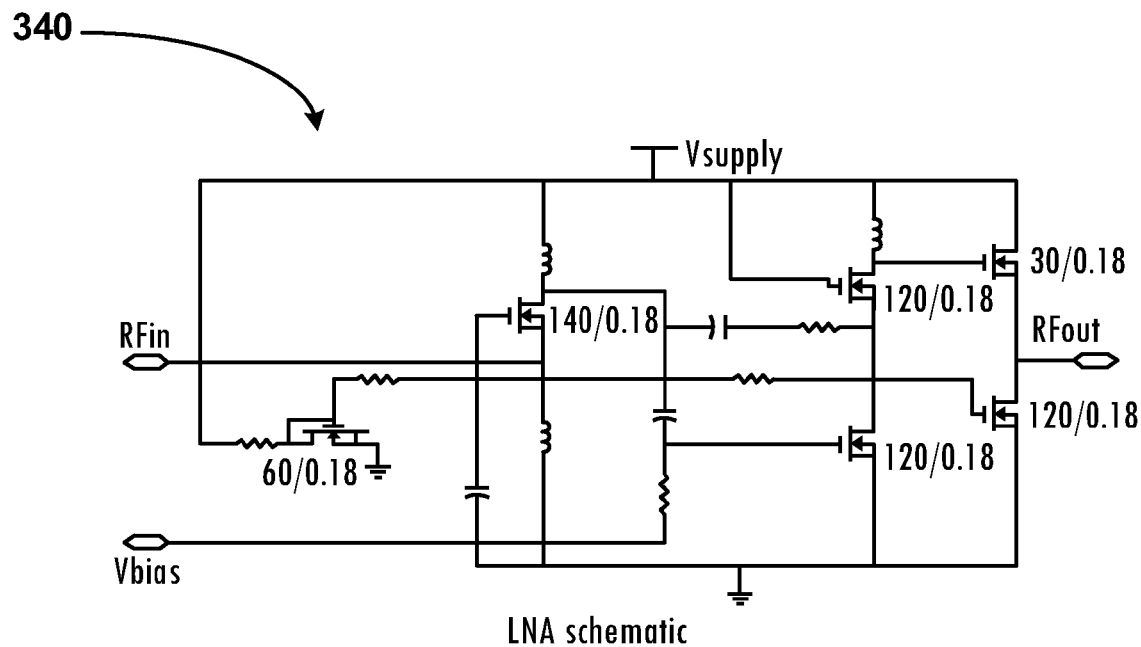
FIG. 4 illustrates a schematic diagram of an exemplary low noise amplifier used in accordance with some embodiments of the present invention.

The amplifier 340 can have varying characteristics according to embodiments of the present invention. For example, the amplifier 340 is preferably a low-noise-amplifier (or LNA). While many LNAs will enable advantageous features of the present invention, the inventors have designed an LNA embodiment for use with the present invention. Thus, while an exemplary LNA is described herein, embodiments of the invention can comprise many other LNAs. Preferably LNAs used in accordance with embodiments of the present invention have built in design knobs (e.g., variable voltage input controls) to enable power versus performance tradeoff. As shown in FIG. 4, the amplifier 340 can be a wideband LNA with a common gate input stage, a common source intermediate stage, and a class A output stage. The LNA shown in FIG. 4, the wideband LNAs supply and bias voltage controls are used as tuning knobs to facilitate adjusting power consumption relative to device performance. Such adjustment enables power consumption management as discussed herein. The amplifier 340 can be fabricated in CMOS 0.18 micron technology. The common gate input stage can provide good input matching over a wide range of input signal frequencies, the common source (CS) intermediate stage can provide a required gain of greater than about 16 dB, and the class A output stage can provide a good signal swing to enable maximizing a signal swing for any given supply. The operating range of the LNA shown in FIG. 4 can be from about 2 to about 7 GHz, and the gain can be about 16 dB at about 2.4 GHz for a nominal supply voltage of about 1.8V and bias of about 0.8V. The LNA shown in FIG. 4 can have a NF of about 3 dB, and DC power consumption of the LNA can be about 25.6 mW.

Figure 5:
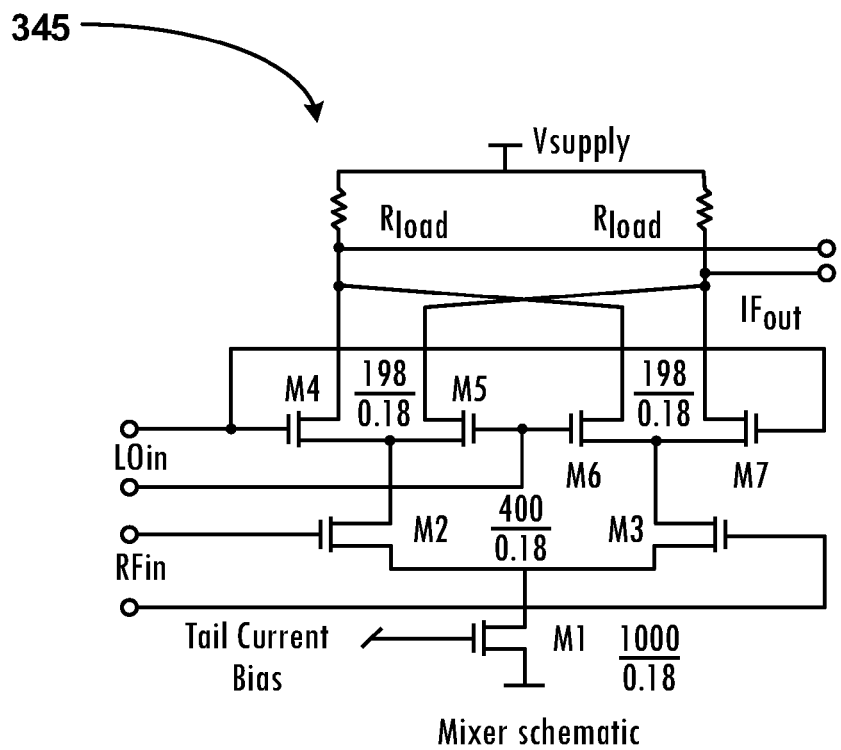
FIG. 5 illustrates a schematic diagram of an exemplary mixer used in accordance with some embodiments of the present invention.

The mixer 345 can also have varying characteristics according to embodiments of the present invention. While many mixers can enable the advantageous features of the present invention, the inventors have designed an exemplary mixer embodiment for use with the present invention. It should be understood, however, that while an exemplary mixer is described herein, embodiments of the invention can comprise many other types of mixers. Preferably, the mixer has built in tuning knobs to facilitate tradeoff between power consumption and device performance. Such tuning knobs can enable control of bias and supply voltages sourced to the mixer 345. In an exemplary mixer embodiment, the inventors have utilized a double-balanced Gilbert cell architecture, which is illustrated in FIG. 5. A balun can be used for single-to-double ended conversion. The mixer can provide a gain of about 11.8 dB, NF of 8 dB. The operating range of the mixer can be from about 2 to about 7 GHz, and the mixer can have a power consumption of about 6.6 mW at a nominal supply voltage of about 1.8V and bias of about 0.8V.

FIG. 3 also illustrates that the controller 330 forms a feedback loop between the signal processor 325 and the input module 320. The feedback loop enables embodiments of the present invention to dynamically adapt to varying channel conditions. The dynamic adaptation, in turn, can enable modified power consumption thereby leading to power usage modification. In some situations, modified power consumption involves controlling of power sourcing in an effort to conserve power. Because the feedback loop includes multiple components of the wireless receiver 305 (e.g., the input module 320, the signal processor 325, and the controller 330), dynamic adjustment can also include how the wireless receiver's 305 components may effect a received wireless signal transmission. For example, manufacturing variances and device aging can result in devices operating differently.

As shown in the embodiment pictured in FIG. 3, the signal processor 325 receives a wireless signal transmission from the input module 305. The signal processor 325 analyzes characteristics of the wireless communication channel 315 based on conditions of the received wireless signal transmission. Preferably, analysis of the received wireless signal transmission includes calculation of an adaption metric as a method to determine quality conditions of the wireless communication channel 315.

The adaptation metric (or metric) calculation can yield a value for use in quantifying conditions of a wireless communication channel. This value can then be used by the signal processor 325 (and/or the controller 330) for dynamically modifying one or more components of the input module 320 for power-usage management. As an example, the adaptation metric can be calculated using an error vector magnitude (EVM) calculation. Utilizing EVM as an adaption metric is preferred in some embodiments because EVM closely models a bit error rate (BER) calculation yet the calculation can be performed by the signal processor 325 (and/or the controller 330) in real time. Other metrics can also be used to determine quality conditions of a wireless channel. Sample alternative metrics include packet error rate, frame drop rate, signal to noise ratio, or received signal strength indication. Still yet, other alternative metrics can include using any of those discussed herein in one or more combinations.

Selecting an adaptation metric is generally driven by a consideration that it should encompass the sum effect of non-idealities in an RF front-end/analog block, channel effects, and noise, etc. In other words, adaptation metric preferably can provide indication of system performance under all possible environmental conditions. As those of ordinary skill in the art will understand, communication system performance is usually quantified in terms of a BER value of a communication system. BER provides a rate at which errors (i.e., bit communication errors) occur during communication. Typical BER values for wireless systems are on the order of about $10^{-3}$ to about $10^{-4}$. Measuring a system's BER typically incurs long processing times as several thousand bits are transmitted and received.

A metric (system specification) that can be easily measured using a DSP processor, like signal processor 325, using less time and that is strongly correlated to a system's BER specification is preferred. As a result, the inventor's have utilized EVM as an adaptation metric for embodiments of the present invention. EVM, like BER is an at-speed specification of a wireless system meaning that it can be measured during actual operation of a wireless device in real time. EVM can be computed using the following equation:

$$EVM = \sqrt{\frac{1}{N} \frac{\sum_{1}^{N} \|y_i - x_i\|^2}{\|y_{max}\|^2}} \quad (1)$$

When using the above EVM equation, the involved variables are:

$y_i$ and $x_i$ are received and transmitted complex modulated data (I+jQ);

$y_{max}$ is the outermost data point in the constellation; and

N is the number of data points used for computation.

From the above equation, EVM quantifies a difference between transmitted and received modulated data. EVM can be easily calculated for each data frame of a received signal. The inventors performed system-level simulations to ascertain and establish a relationship between EVM and BER specifications.

Turning back now the FIG. 3, the signal processor 325 (and/or the controller 330) has been operatively configured to implement an adaptation metric. Indeed, the processor 325 has been configured to perform an EVM calculation on a received wireless signal transmission in real-time. In response, the signal processor 325 can communicate with the processor 330 to adjust supply and bias voltages of the input module's 320 components. As illustrated, the controller 330 can control supply and bias voltages of the amplifier 340 and mixer 345. In some embodiments, the controller 330 can also control resolution settings of the analog-to-digital converter 360 and also operational characteristics of the signal processor 325. By controlling one or more components of the input module 320 and on or more operational characteristics of the signal processor 325, embodiments of the present invention can enable an adaptive RF front end and baseband processor design. These advantageous features enable embodiments of the present invention to dynamically respond to varying communication channel conditions to aid in power-usage modifications.

Again, it should be understood that while shown as separate components, the processor 325 and the controller 330 may be the same component. Indeed, in some embodiments, it may be desired for the signal processor 325 to calculate an adaption metric (e.g., EVM) for a received wireless signal transmission and to also control components of the input module 305 by adjusting voltages provided to components of the input module.

Embodiments of the present invention can also include various control optimization features. Indeed, in some preferred embodiments, the wireless receiver 305 may be dynamically tuned such that a calculated EVM of a received signal is maintained within a margin or guard band above current worst-case channel conditions. Optimizing the receiver 305 to implement a guard band generally includes modeling or testing a device to determine a control law for the device and then storing the control law in a memory of the device. For example, as shown in FIG. 3, the wireless receiver's 305 signal processor 325 includes a memory 326 for storing a control law 327.

Figure 6:
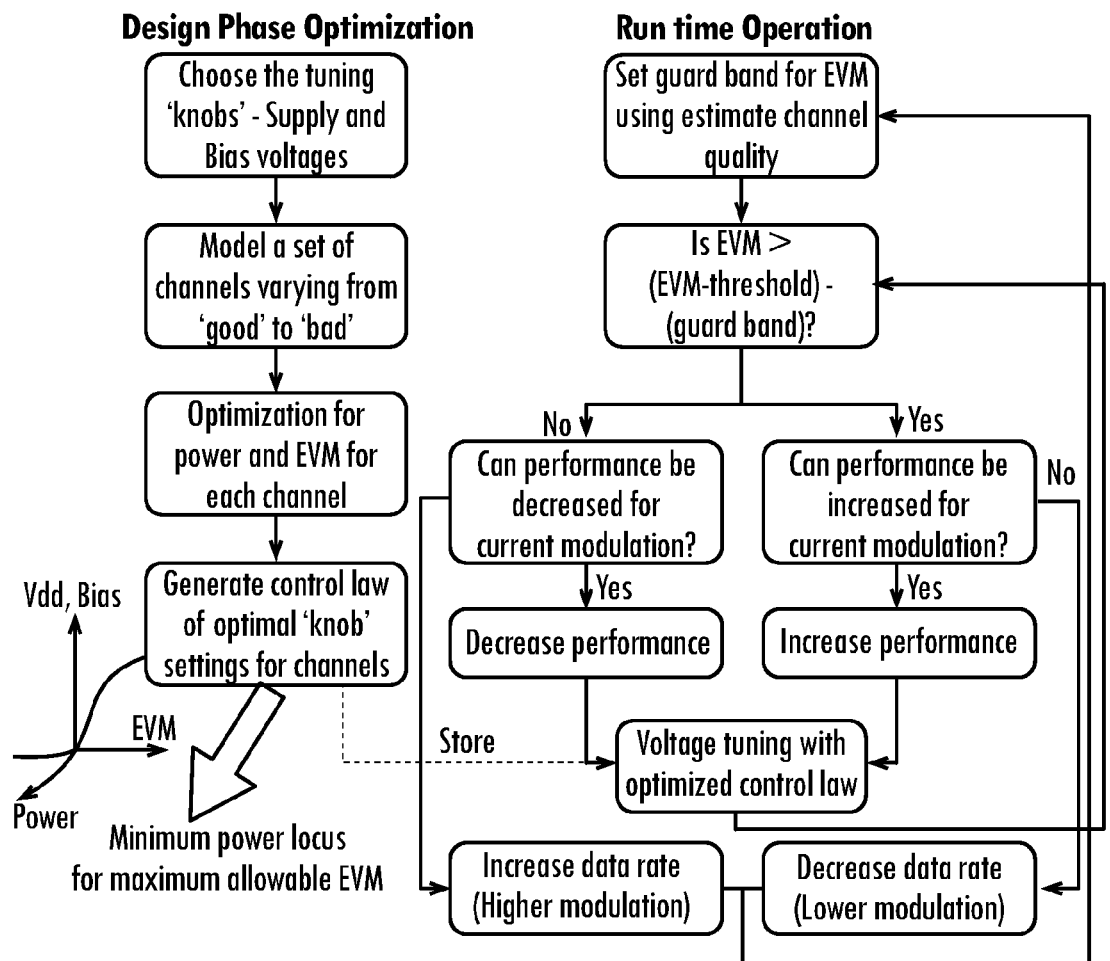
FIG. 6 illustrates an exemplary wireless device optimization process according to some embodiments of the present invention.

FIG. 6 illustrates an exemplary wireless device optimization process 600 flow chart according to some embodiments of the present invention. As illustrated, the flow chart shows iterations performed during a design and characterization phase as well as a control scheme during run time operation of a wireless device. During the design and characterization phase, first a set of tunable control 'knobs' (or variable operating features) are identified that trade-off device performance with power consumption as modified. For example, supply and bias voltages of the amplifier 340 ($V_{ddL}$, $V_{bL}$) and the mixer 345 ($V_{ddM}$, $V_{bM}$) can be used as knobs or control parameters. A finite set of channel conditions that adequately span the range 'good' to 'bad' can then be modeled. Different channels are obtained by perturbing the different communication channel parameters (noise, multipath components, and interference sources).

For each chosen channel condition, an optimal set of tuning parameters can be computed through co-optimization for power and EVM metrics. The computed optimal set for different channel conditions define an optimal locus of tuning parameter values corresponding to lowest power consumption for a maximum allowed EVM. During run time operation, as shown in FIG. 6, a control law running operates a system along an optimal locus for varying channel conditions. In some embodiments, the control law may be stored in a memory residing in the processor 325 (or in the controller 330 if separate components are desired) for controlling a wireless receiver.

A heuristic co-optimization procedure can be used to compute an optimal set of tuning parameters (e.g., bias and supply voltages) for each channel condition for a wireless device. The optimization procedure can be performed as follows: initially, with a device operating under nominal voltage condition: $V_{ddL}=1.8V, V_{bL}=0.8V, V_{ddM}=1.8V, V_{bM}=0.8V$ the following matrix (M) can be calculated through simulations:

$$M = \begin{bmatrix} \frac{\partial p}{\partial V_{ddL}} & \frac{\partial p}{\partial V_{bL}} & \frac{\partial p}{\partial V_{ddM}} & \frac{\partial p}{\partial V_{bM}} \\ \frac{\partial EVM}{\partial V_{ddL}} & \frac{\partial EVM}{\partial V_{bL}} & \frac{\partial EVM}{\partial V_{ddM}} & \frac{\partial EVM}{\partial V_{bM}} \\ \frac{\partial p}{\partial EVM_{ddL}} & \frac{\partial p}{\partial EVM_{bL}} & \frac{\partial p}{\partial EVM_{ddM}} & \frac{\partial p}{\partial EVM_{bM}} \end{bmatrix}$$

For example, $$\frac{\partial p}{\partial V_{ddL}} \text{ and } \frac{\partial EVM}{\partial V_{ddL}}$$

denotes a change in power consumption and EVM metric for a unit change in supply voltage of the LNA ($V_{ddL}$), and likewise for other entries in matrix M. The third row of the matrix is obtained through a simple ratio of these two quantities. As a result, each entity in the third row of matrix M provides an estimate of a change in power consumption of a wireless device circuit for a unit change in the EVM metric. The tuning parameter for each iteration is then chosen by selecting the maximum of the four entities in the third row. This enables tuning of a voltage parameter that produces a maximum reduction in power consumption for a least increase in EVM. Once a particular voltage parameter is selected, it is scaled down to generate a new set, and matrix M is recomputed, and the procedure is repeated.

The iteration continues until an EVM threshold condition is violated or all possibilities are exhausted. This yields an optimal voltage set ($V_{ddL}$, $V_{bL}$, $V_{ddM}$, and $V_{bM}$) for each channel condition. These values can be then stored in a look up table (e.g., stored within a memory) in a signal processor for adaptation during operation of a wireless device, e.g., the wireless receiver 305. In other words, these calculated values can be used to dynamically adjust the amplifier 340 and the mixer 345 components of the input module 320. This type of dynamic control is shown in FIG. 6's Run Time Operation whereby voltage tuning is done. As shown, voltage tuning can be performed in response to comparing a calculated EVM against a predetermined guard band to ensure operation and tuning in accordance with a stored control law.

During operation of a wireless communication system according to the present invention, such as the wireless receiver 305, sourced voltages can be continuously scaled down to reduce power consumption for every data rate. This results in voltage modulation. By scaling voltages ($V_{ddL}$, $V_{bL}$, $V_{ddM}$, and $V_{bM}$) down, a system-level performance metric, such as EVM, degrades. This is allowed to continue until the EVM is within a certain pre-defined threshold value. A guard band for an EVM threshold is set based on the channel quality conditions (i.e., environmental conditions) in which a device operates. In some embodiments, a guard band can be chosen to correspond to worst case channel conditions so that a corresponding device can always operate in a margin safely above the worst case channel condition as modified by ever-changing environmental conditions. The magnitude of the guard band or margin can be set and or controlled during device definition phase, which is a one-time procedure. For example, a poor channel would have a larger guard band and vice versa. After this, the performance (supply and bias voltages) of the RF front-end (or input module 320) is increased or decreased for a current data rate depending on a computed EVM. Indeed, voltages can be scaled up or down based on an optimized control law stored in a lookup table. A device's power consumption (like the wireless receiver 305), can thus hovers around a lowest possible value for which received signal quality meets a required specification. This advantageous feature of the present invention achieves power savings by operating a system at lowest possible power for all channel conditions using a closed loop feedback control.

Figure 7:
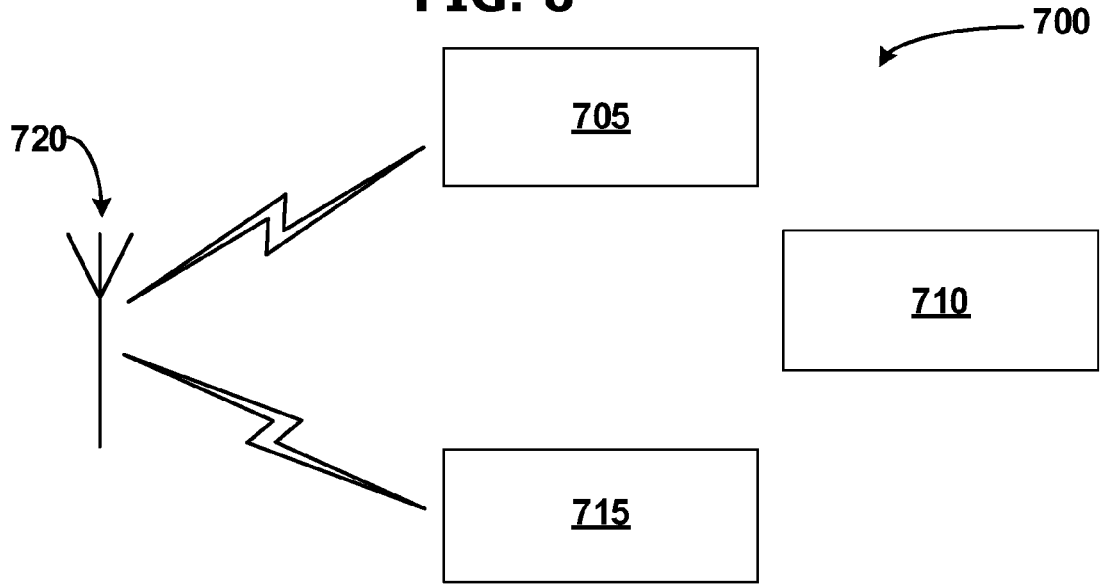
FIG. 7 illustrates a functional block diagram of a low-power wireless communication system that incorporates a wireless low-power transceiver according to some embodiments of the present invention.

FIG. 7 illustrates a functional block diagram of a wireless transceiver 700 system according to some embodiments of the present invention. Generally, the wireless transceiver 700 comprises a receiver module 705, a signal processing module 710, a transmitter module 715, and a remote communication system 720. The receiver module 705 can receive wireless signals and can be configured to function as the wireless receiver 305 discussed above. In addition, the receiver module 705 can comprise the same components as the wireless receiver 305 discussed above as well as the components illustrated in FIG. 3. The signal processing module 710 can function similar to the signal processor 325 and the controller 330 discussed above. For example, the signal processing module 710 may include the signal processor 325 and the controller 330 as separate components, or in some embodiments, the signal processor 325 and the controller 330 may be combined in a single component and part of the signal processing module 710. Given that the receiver module 705 and the signal processing module 710 operations have been discussed above (with reference to discussion of FIG. 3), these details will not be repeated here.

The communication system 720 may be various types of wireless communication devices. Indeed, the remote communication system 720 is shown as an antenna in FIG. 7, the remote communication system 720 may be many types of systems capable of wireless communication. Such systems may include, for example, wireless routers, repeaters, cell phone towers, cell phone transponders, wireless node transmission points in a wireless network, handheld telephones, wireless computers, handheld computers, PDAs, wireless network gateways, and any combination thereof.

Figure 8:
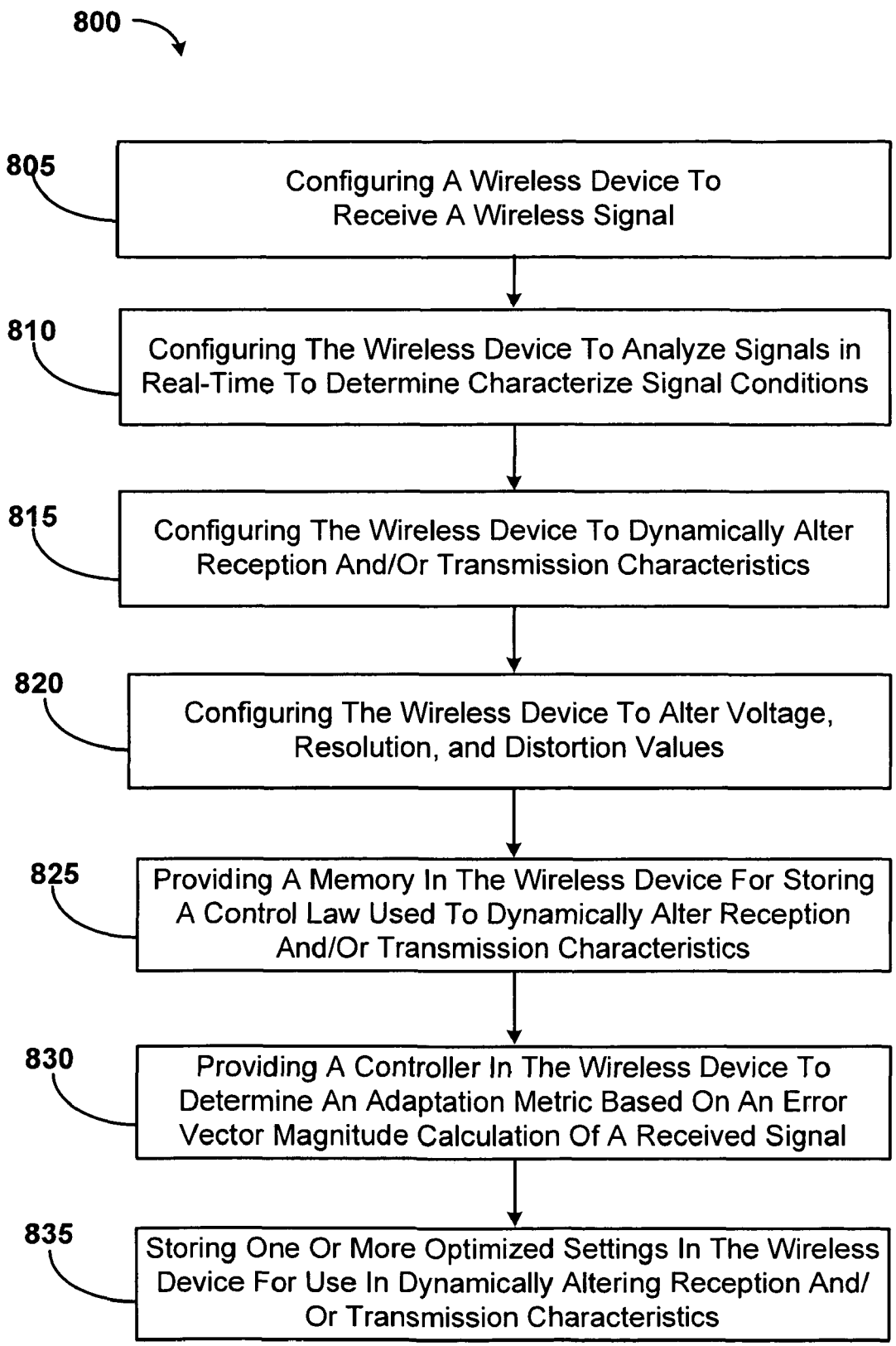
FIG. 8 illustrates a flow diagram of a low-power wireless communication method according to some embodiments of the present invention.

FIG. 8 illustrates a flow diagram of a method embodiment 800 for configuring a wireless device to operate with improved power management operations according to some embodiments of the present invention. It should be understood that method 800 can be carried out in various orders and that various embodiments of the present invention can be implemented in different method embodiments. It should be further understood that various components of a wireless communication system (e.g., wireless receiver, wireless transmitter, and wireless transceiver) can implement the method embodiment 800.

The method embodiment 800 of the present invention can generally include several actions to configure a wireless device for low-power communication. For example, the method 800 can include configuring a wireless device to receive a wireless communication signal at 805. The method 800 can also include configuring a wireless device to dynamically analyze received wireless communication signals in real-time at 810. This analysis can be performed to determine characteristics about a wireless communication channel in which the wireless communication signal travels. The analysis can yield a quality of signal metric (e.g., an adaption metric) about the wireless communication channel. The method 800 may also include configuring a wireless device to dynamically modify transmission and reception operations in response to the determined characteristics at 815.

The method 800 may also include additional advantageous features. For example, the method 800 may include configuring a wireless device to dynamically alter voltage, resolution, and/or distortion values provided to one or more device components. Alteration of the provision of these may be in response to determined characteristics determined about the wireless communication channel at 820. As another example, the method 800 may further comprise providing a wireless device with a memory to store a control law at 825. The control law can be used to dynamically modify a wireless device's transmission and reception operations in response to characteristics determined about a wireless communication channel. As yet another example, the method 800 may also include providing a wireless device with a controller configured to determine an adaptation metric based at least in part on an error vector magnitude of a received wireless communication signal at 830. The method 800 may also include determining an optimized set of settings for a wireless device and storing the optimized settings in the device for use as a control law at 835. The control law can be used to dynamically control the device to ensure that it consumes minimal power for maximum allowable amount of signal quality degradation.

Still yet, the method 800 may also include providing a wireless device with a controller. The controller can be configured to establish a dynamic guard band setting (or margin) such that device operates marginally above a predetermined bit error rate. In some embodiments, the guard band setting is set a marginal amount above a signal quality metric corresponding to a BER or EVM associated with given channel conditions. Establishing of a guard band and operating relative to the guard band enables a controller (or processor) to operate a wireless device within the guard band yet marginally above a BER or EVM associated with given channel conditions to ensure communication without errors.

Simulation Results Summary

The inventors have also tested embodiments of their invention using various modeling techniques. The results of the simulations are provided below and graphical test results are shown in the figures referenced below. The below test explanations and simulation results are exemplary test explanations and should not be used to limit the breadth and scope of the present invention.

Simulations were performed on a wireless receiver system to obtain an optimal voltage set for different channels. The system was first simulated for QPSK modulation, and then for 16-QAM modulation. A set of 12 different channels (Channel 1 (best)-Channel 12 (worst)) was modeled for study purposes. The optimal voltages obtained from the simulations for various channels are plotted in FIG. 9. The received QPSK and 16-QAM constellations for nominal voltage operation and optimal voltage values (EVM metric close to the threshold) are shown in FIG. 10.

Figure 9:
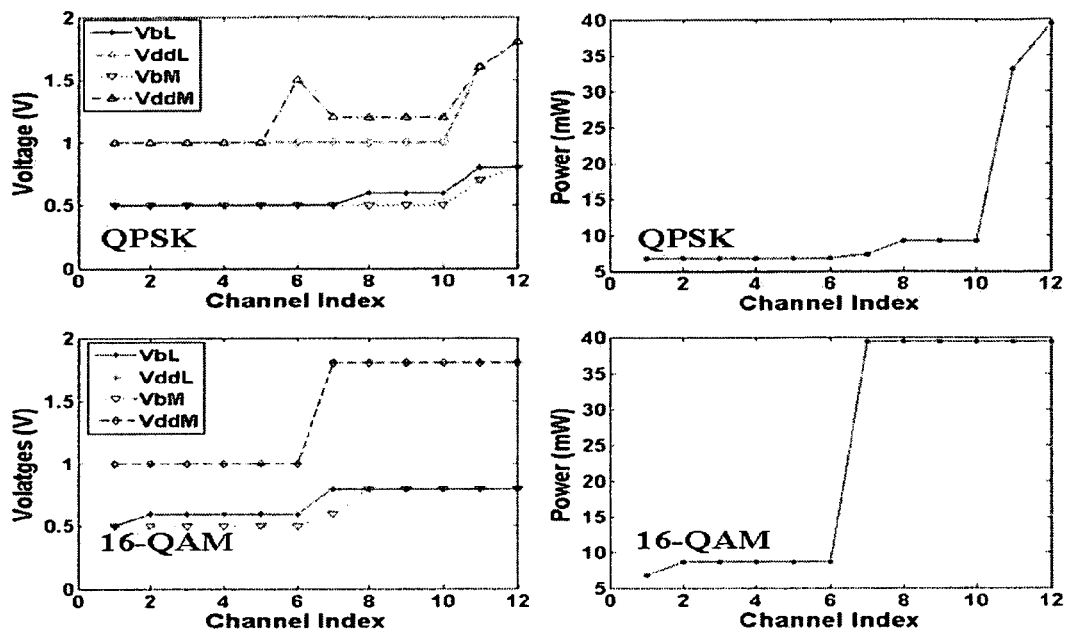
FIG. 9 illustrates several charts depicting data obtained during simulation of various embodiments of the present invention.

As observed from FIG. 9, a computed optimal voltage set varies between the nominal (0.8V, 1.8V, 0.8V, 1.8V) to the lowest possible values (0.5V, 1.0V, 0.5V, 1.0V) over the different channel conditions. As shown, for a majority of the channel conditions, the tested wireless receiver operated at lower than nominal voltage values. This enabled significant savings in device power consumption. As also show, optimal voltage values and associated power consumption is lower for QPSK-modulated signals compared to 16-QAM. This was likely due to the tighter signal quality and SNR requirements for a 16-QAM signal (higher data rates).

Figure 10:
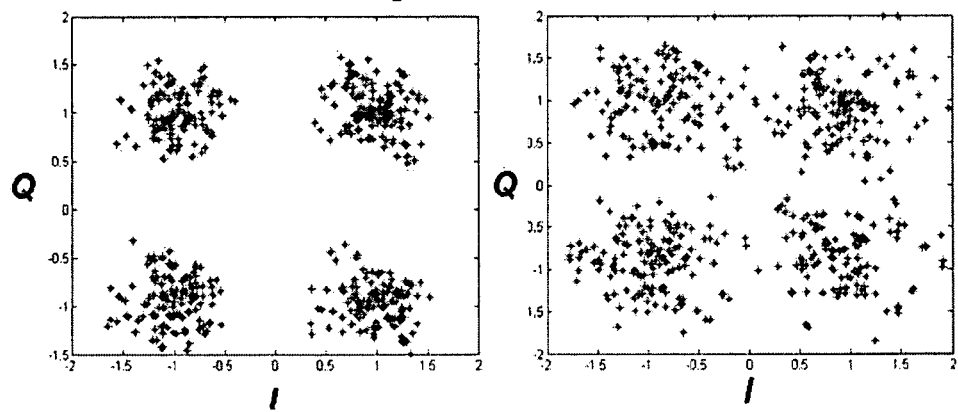
FIG. 10 illustrates several charts depicting data obtained during simulation of various embodiments of the present invention.
Figure 10:
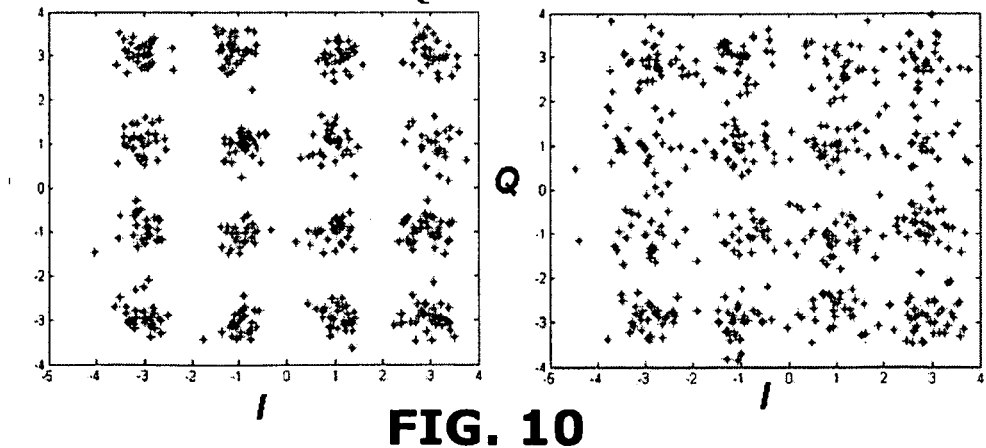

The plots shown in FIG. 10 highlight an advantage of embodiments of the present invention: using design margins to operate a device at a minimum power threshold that yields acceptable signal degradation. In the absence of feed-back driven adaptation, the receiver system always operates at nominal voltage levels (power=40 mW), whereas in the tested receiver embodiments, power consumption tends towards 40 mW only for certain channels (only Channel 12 for QPSK modulation). For good channels, QPSK modulation requirements are met at RF front-end power levels of just 6.6 mW (16.5% of the nominal power).

In existing wireless systems, data rate (modulation) is dynamically changed by a higher-level protocol. For example, modulation is changed from QPSK to 16-QAM (higher data rates) if channel conditions are good. Due to the shift in modulation, the power savings that can be obtained is reduced (due to tighter requirements of 16-QAM) in favor of higher transmission rates. However, the feedback-driven control then ensures that the device operation is optimal for 16-QAM modulation. Thus, using embodiments of the present invention enables receiver operation at low (virtually zero margin) power consumption levels for all modulations under temporally varying environmental conditions.

As discussed above, process variability causes performance metrics of manufactured devices to vary from nominal values. The effect of process variability on power consumption of embodiments of the present invention is shown in FIG. 11. A set of 50 perturbed instances of an LNA and a mixer were simulated and corresponding behavioral parameters were extracted for MATLAB simulations. Adaptive run-time feedback control was then implemented for the 50 devices for 4 different channel conditions. FIG. 11 plots variation in an optimal power consumption metric among the 50 perturbed instances for different channels.

The adaptive feedback control scheme operated the tested devices along an optimal locus for each channel based on a control law prepared for the test. An optimal control law (used to modify, for example, supply and bias control for the LNA and mixer) was obtained for a nominal device during characterization phase and stored in a look up table, the control law proved effective in operating different process-skewed devices at reduced power consumption levels. This is feasible due to the feedback-driven control mechanism that is employed to tune the tuning knobs (supply and bias control for the LNA and mixer) of the tested wireless device. Thus for all the 50 perturbed devices, the voltages were regulated such that operation was close to the error boundary. Power savings amounts for each device depends on its process spread and its correlation to the optimal locus obtained for a nominal device.

In addition to software simulations, the inventors also simulated embodiments of the present invention with hardware testing. For hardware testing, a basic receiver RF front-end comprising supply and bias tunable LNA and mixer circuits were designed using off-the-shelf components on a printed-circuit-board. A schematic of the hardware set up is illustrated in FIG. 12A. The circuits were designed using BPF520 transistor from Infineon Technologies, and the frequency of operation was 2 GHz. The supply and bias voltages of the circuits were controlled using a precision Keithley 2400 DC power supply sources with GPIB control from a personal computer. The transmission chain was implemented using RF Micro Devices 2638 mixer and UPC2763TB PA from California Eastern Laboratories. The OFDM baseband functionality was coded in MATLAB, and was interfaced with the RF front-end through National Instruments DAQ card (PCI-6115).

While repeatable channel conditions are easily modeled in simulation by perturbing the attenuation, multipath, and interference components, it is not possible in hardware considering the limitations of the test setup (especially multipath). Therefore, channel numbers for hardware experiments was limited to 8 (using attenuators, and interference signal from an Agilent E4432B signal generator). FIG. 12A also shows the hardware setup and the measured minimum power consumption levels in RF receiver for different channels (optimal locus) with QPSK EVM compliance of 30%.

Figure 13:
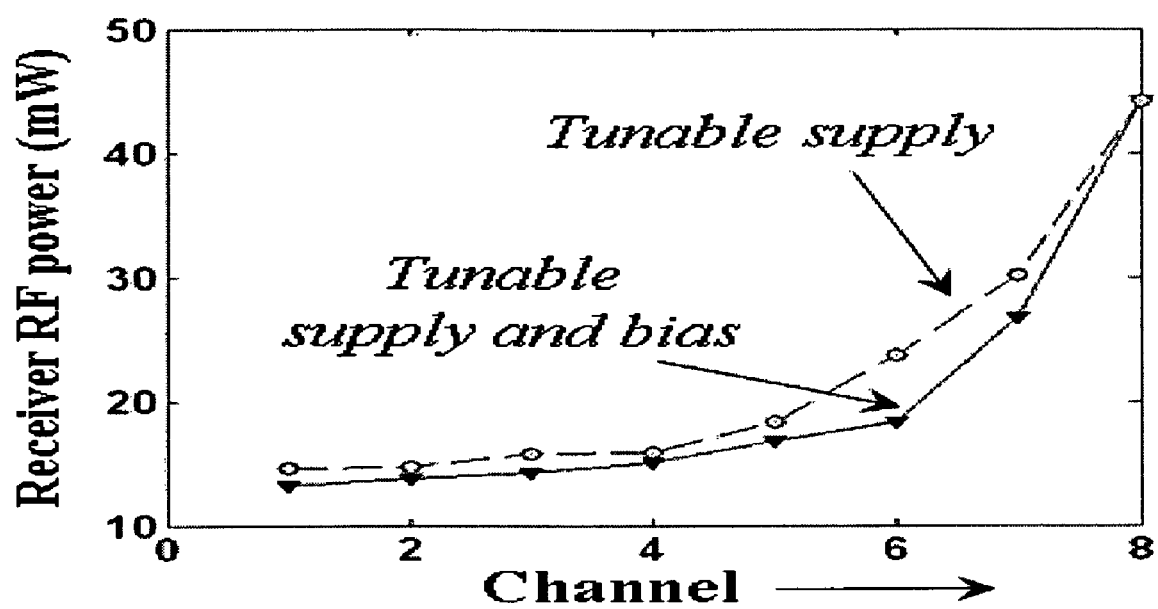
FIG. 13 illustrates a graph of power consumption as a function of wireless communication channel resulting from testing of the wireless receiver embodiment shown in FIG. 12A.

Initially, the system was tested with only the LNA and mixer supply voltages as the tunable control knobs. The optimal locus (power vs. control knob values) is plotted in FIG. 12B. across the 8 channels. The maximum and minimum power consumptions along the locus are observed to be about 44 mW and 13.5 mW, respectively. The locus can be obtained by running the optimization procedure on the hardware module for different the channels as discussed above. For this purpose, the LNA and mixer circuits are characterized across all combinations of the control knob settings. Next, LNA and mixer bias voltages are included as additional control knobs, and experiments are repeated. As observed from FIG. 13, more power is saved in this case with a minimum value of 12.8 mW for the best channel. This demonstrates that power savings can be obtained even in a receiver designed from off-the-shelf components, if channel-driven multidimensional tuning is employed.

The embodiments of the present invention are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

We claim:

1. A low-power wireless communication receiver capable of adapting to dynamically changing communication channel conditions, the receiver comprising: an input module to receive a wireless signal from a communication channel; a controller coupled to the input module to receive the wireless signal and to provide a control signal corresponding to conditions of the communication channel, the controller being operatively configured to dynamically modify the control signal responsive to at least one of conditions of the wireless signal and the communication channel; and a feedback loop disposed between the controller and the input module, the feedback loop adapted to dynamically provide the control signal to the input module such that the input module can modify quality conditions of the wireless signal, the controller configured to provide a guard band setting responsive to conditions of the wireless signal and further configured to modify the control signal based on the guard band setting such that the wireless signal maintains a quality characteristic above an error rate associated with the communication channel.

2. A low-power wireless communication receiver capable of adapting to dynamically changing communication channel conditions, the receiver comprising: an input module to receive a wireless signal from a communication channel; a controller coupled to the input module to receive the wireless signal and to provide a control signal corresponding to conditions of the communication channel, the controller being operatively configured to dynamically modify the control signal responsive to at least one of conditions of the wireless signal and the communication channel; and a feedback loop disposed between the controller and the input module, the feedback loop adapted to dynamically provide the control signal to the input module such that the input module can modify quality conditions of the wireless signal, the controller configured to modify the control signal such that the input module can receive the wireless signal at varying data rates.

3. A low-power wireless communication receiver capable of adapting to dynamically changing communication channel conditions, the receiver comprising: an input module to receive a wireless signal from a communication channel; a controller coupled to the input module to receive the wireless signal and to provide a control signal corresponding to conditions of the communication channel, the controller being operatively configured to dynamically modify the control signal responsive to at least one of conditions of the wireless signal and the communication channel; and a feedback loop disposed between the controller and the input module, the feedback loop adapted to dynamically provide the control signal to the input module such that the input module can modify quality conditions of the wireless signal, the controller further being configured to generate an adaption metric based in part on conditions of at least one of the wireless control signal and the communication channel, wherein the adaption metric is used at least partially for generation of the control signal for modifying the wireless signal, wherein the adaptation metric generated by the controller is an error vector magnitude characteristic of the wireless signal.

4. A low-power wireless communication receiver capable of adapting to dynamically changing communication channel conditions, the receiver comprising: an input module to receive a wireless signal from a communication channel; a controller coupled to the input module to receive the wireless signal and to provide a control signal corresponding to conditions of the communication channel, the controller being operatively configured to dynamically modify the control signal responsive to at least one of conditions of the wireless signal and the communication channel; and a feedback loop disposed between the controller and the input module, the feedback loop adapted to dynamically provide the control signal to the input module such that the input module can modify quality conditions of the wireless signal, further comprising an analog-to-digital converter disposed between the input module and the controller, the analog-to-digital controller being configured to receive the control signal from the controller and in response modify a resolution characteristic of an output of the analog-to-digital converter.

5. A low-power wireless transceiver for use in wireless communication devices, the transceiver comprising:

a receiver module and a transmitter module both coupled to a signal processor module, the signal processor adapted to process received wireless signals and process signals for transmission; and a controller operatively configured to dynamically control at least one of the receiver module and the signal processor module in response to quality conditions of received wireless communication signals by providing a control signal to the at least one of the receiver module and signal processor module, the controller further comprising a memory for storing a control law, the control law comprising a plurality of predetermined values used to provide the control signal for dynamically altering operational characteristics of the receiver module or the signal processor module, wherein the control law is a function of a minimum power locus and a quality of signal metric.

6. A low-power wireless transceiver for use in wireless communication devices, the transceiver comprising:

a receiver module and a transmitter module both coupled to a signal processor module, the signal processor adapted to process received wireless signals and process signals for transmission; and a controller operatively configured to dynamically control at least one of the receiver module and the signal processor module in response to quality conditions of received wireless communication signals by providing a control signal to the at least one of the receiver module and signal processor module, wherein the control signal comprises a converter portion to dynamically modify resolution characteristics of at least one of an analog-to-digital converter and a digital-to-analog converter.

7. A low-power wireless transceiver for use in wireless communication devices, the transceiver comprising:

a receiver module and a transmitter module both coupled to a signal processor module, the signal processor adapted to process received wireless signals and process signals for transmission; and a controller operatively configured to dynamically control at least one of the receiver module and the signal processor module in response to quality conditions of received wireless communication signals by providing a control signal to the at least one of the receiver module and signal processor module, the control signal further operatively configured to calculate an adaption metric based at least in part on conditions of received wireless communication signals to provide the control signal for dynamically controlling to the receiver module or the signal processor module, further comprising providing the device with a controller configured to determine an adaptation metric based at least in part on an error vector magnitude of the received wireless communication signal.

8. A low-power wireless transceiver for use in wireless communication devices, the transceiver comprising:

a receiver module and a transmitter module both coupled to a signal processor module, the signal processor adapted to process received wireless signals and process signals for transmission; and a controller operatively configured to dynamically control at least one of the receiver module and the signal processor module in response to quality conditions of received wireless communication signals by providing a control signal to the at least one of the receiver module and signal processor module, the control signal further operatively configured to calculate an adaption metric based at least in part on conditions of received wireless communication signals to provide the control signal for dynamically controlling to the receiver module or the signal processor module, further comprising providing the device with a controller configured to establish a dynamic guard band setting such that device operates marginally above a predetermined bit error rate.

9. A low-power wireless transceiver for use in wireless communication devices, the transceiver comprising:

a receiver module and a transmitter module both coupled to a signal processor module, the signal processor adapted to process received wireless signals and process signals for transmission; and a controller operatively configured to dynamically control at least one of the receiver module and the signal processor module in response to quality conditions of received wireless communication signals by providing a control signal to the at least one of the receiver module and signal processor module, the control signal further operatively configured to calculate an adaption metric based at least in part on conditions of received wireless communication signals to provide the control signal for dynamically controlling to the receiver module or the signal processor module, further comprising determining a control law as a function of minimum power locus for a maximum allowable wireless signal quality of signal metric and storing said control in the device for analyzing the received wireless communication signal in real-time.

* * * * *